March 24, 1931.  A. R. WAMMACK  1,797,598
MECHANISM FOR RENDERING SPOTLIGHTS DIRIGIBLE
Filed May 12, 1930  3 Sheets-Sheet 1
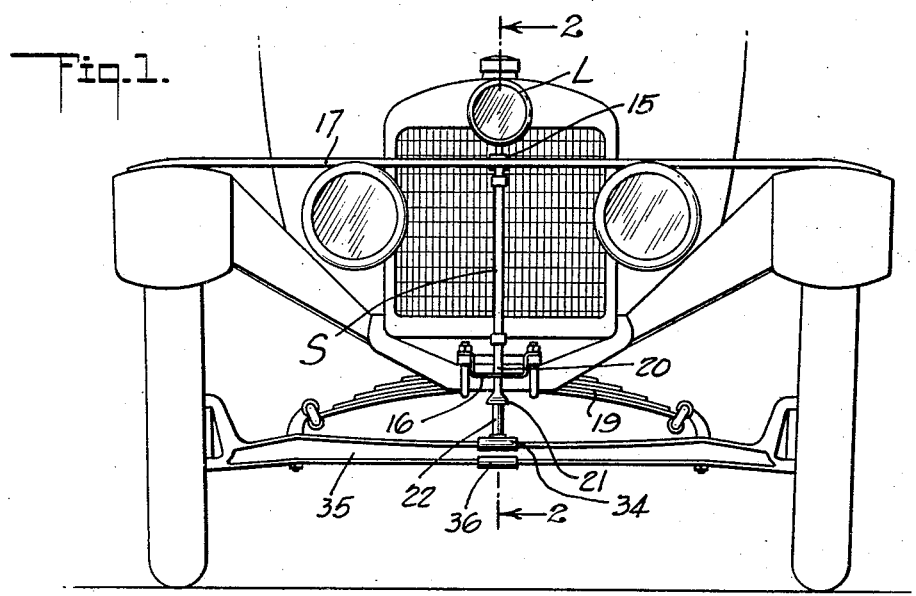
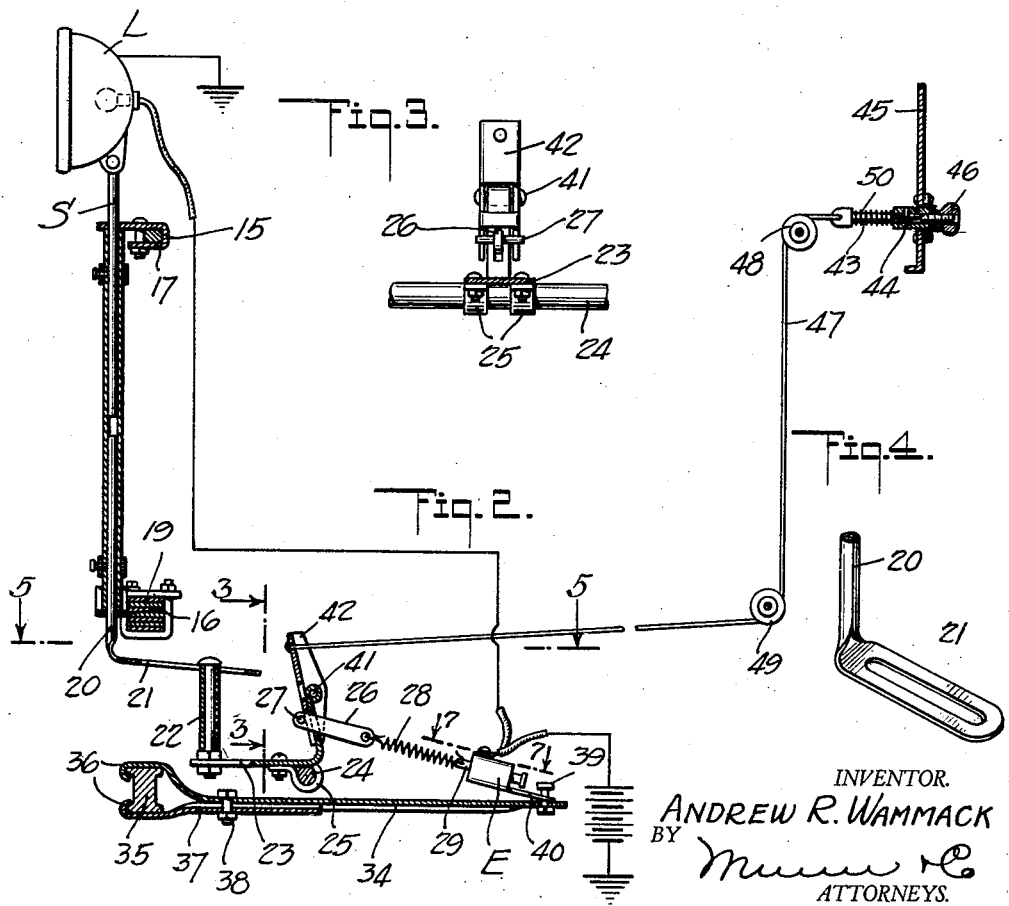
INVENTOR.
ANDREW R. WAMMACK
BY
ATTORNEYS.

March 24, 1931.   A. R. WAMMACK   1,797,598
MECHANISM FOR RENDERING SPOTLIGHTS DIRIGIBLE
Filed May 12, 1930   3 Sheets-Sheet 2
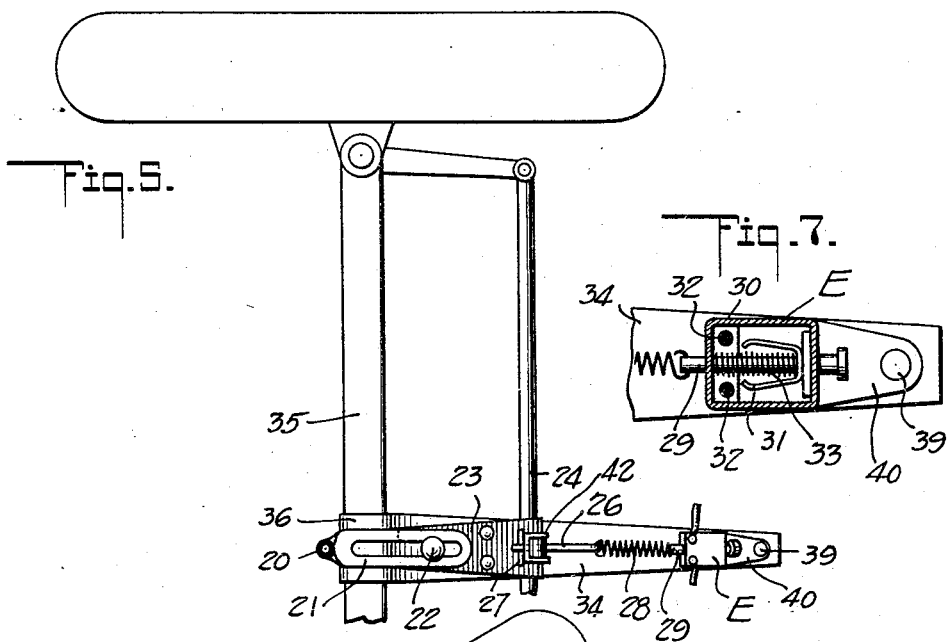
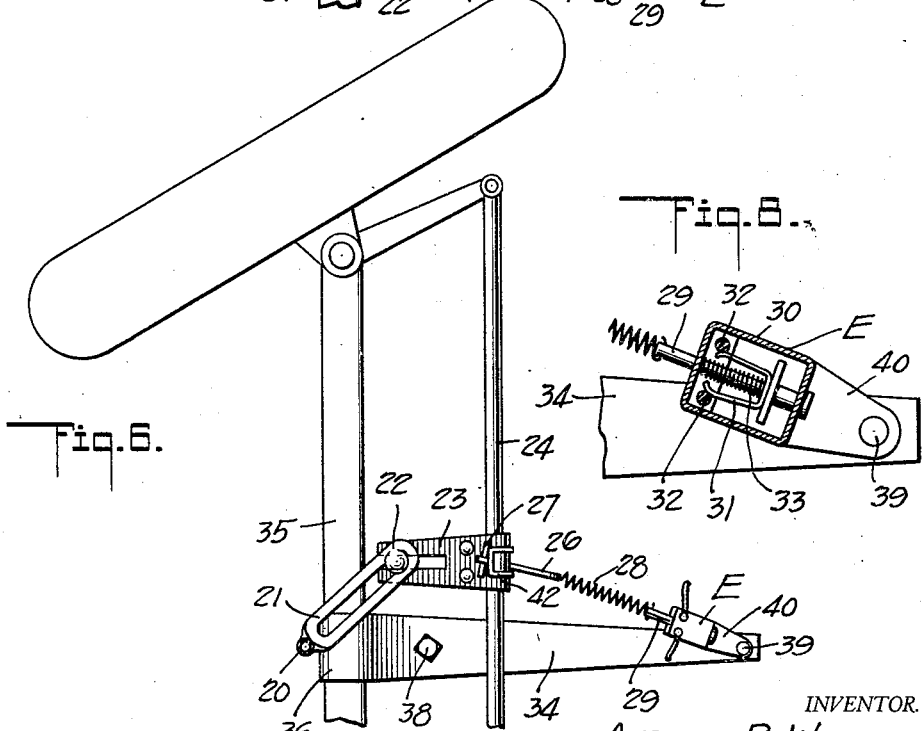
INVENTOR.
ANDREW R. WAMMACK
BY
ATTORNEYS.

March 24, 1931.  A. R. WAMMACK  1,797,598
MECHANISM FOR RENDERING SPOTLIGHTS DIRIGIBLE
Filed May 12, 1930  3 Sheets-Sheet 3
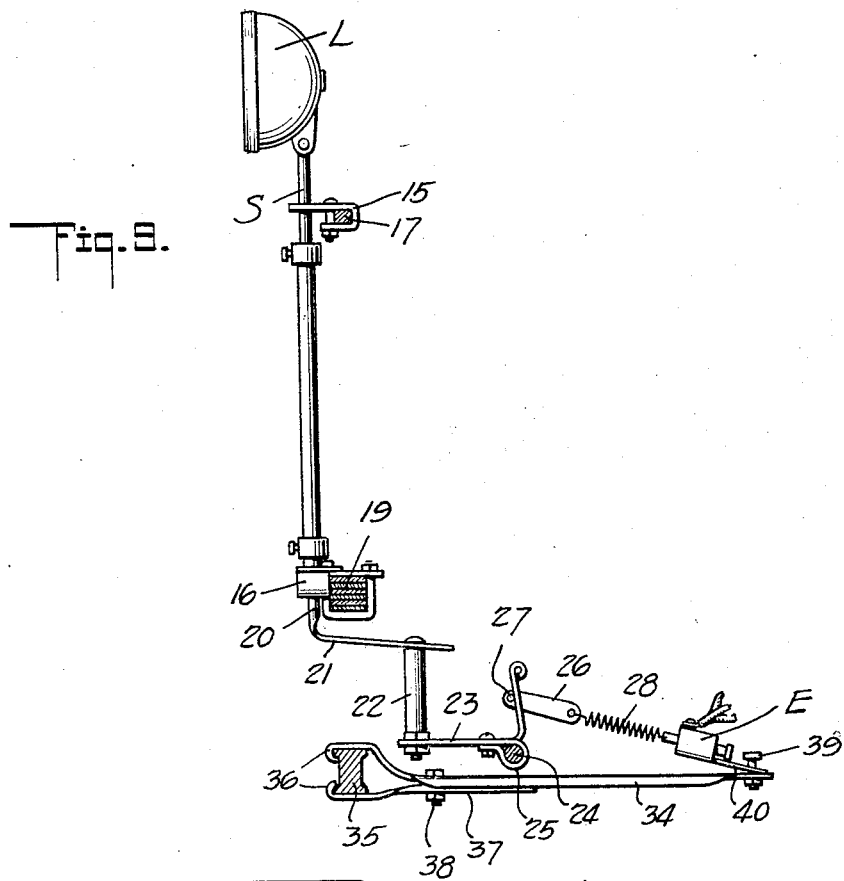
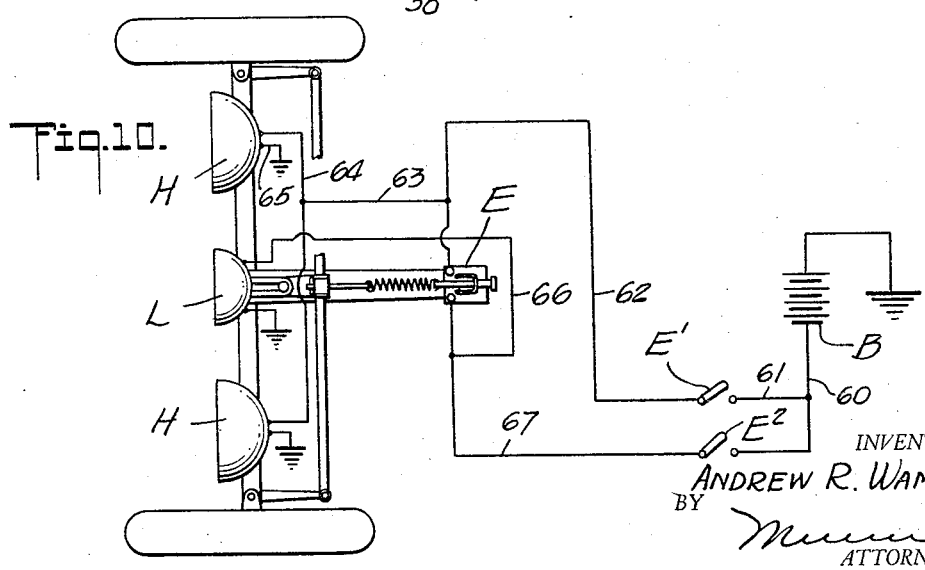
INVENTOR.
ANDREW R. WAMMACK
BY
ATTORNEYS.

Patented Mar. 24, 1931

1,797,598

UNITED STATES PATENT OFFICE

ANDREW R. WAMMACK, OF BRENTWOOD HEIGHTS, CALIFORNIA

MECHANISM FOR RENDERING SPOTLIGHTS DIRIGIBLE

Application filed May 12, 1930. Serial No. 451,789.

My invention relates to spotlights as used on motor vehicles and which are dirigible to move in accordance with the steering movements of the front wheels of the vehicle for the purpose of illuminating turns in the roadway in advance of any turning movement of the vehicle. Spotlights of this character when once lighted so remain in all positions of adjustment, and consequently, there is an unnecessary consumption of current, for when the spotlight is positioned to direct its rays straight ahead of the vehicle, the resultant illumination is of no value in clear weather beyond the illumination provided by the headlights of the vehicle.

It is a purpose of my invention to provide in a mechanism for rendering a spotlight dirigible, a switch for controlling the supply of current to the spotlight in such manner that the spotlight is illuminated only when the front wheels of the vehicle are positioned to produce a turning movement of the vehicle, and when the vehicle is moving straightforward, the spotlight is extinguished.

It is also a purpose of my invention to provide in a mechanism of the above-described character, means for manually closing the switch independently of the automatic means and so as to light the spotlight when the vehicle is moving straightforward so that in foggy or stormy weather the concentrated beam of the spotlight may be utilized to penetrate the fog, rain, or snow, to produce greater visibility for the driver under such adverse driving conditions.

I will describe only two forms of mechanism for rendering spotlights dirigible embodying my invention, and will then point out the novel features thereof in claims.

In the accompanying drawings:

Fig. 1 is a view showing in front elevation one form of mechanism embodying my invention in applied position to a motor vehicle.

Fig. 2 is an enlarged vertical sectional view taken on the line 2—2 of Fig. 1.

Fig. 3 is a fragmentary vertical sectional view taken on the line 3—3 of Fig. 2.

Fig. 4 is a fragmentary perspective view of the connecting arm of the mechanism shown in Fig. 2.

Fig. 5 is a horizontal sectional view taken on the line 5—5 of Fig. 2 and showing one of the front wheels of the motor vehicle in a straightforward position.

Fig. 2 is a view similar to Fig. 5 showing the front vehicle wheel in an angular position to effect turning movement of the vehicle and with the parts of the mechanism in corresponding position.

Fig. 7 is an enlarged horizontal sectional view taken on the line 7—7 of Fig. 2.

Fig. 8 is a view similar to Fig. 7 showing the switch in closed position as distinguished from the open position illustrated in Fig. 7.

Fig. 9 is a view similar to Fig. 2 showing a modified form of mechanism embodying my invention.

Fig. 10 is a semi-diagrammatic view showing the mechanism of Fig. 9 in plan and the electrical circuits thereof.

Similar reference characters refer to similar parts in each of the several views:—

In the form of my invention illustrated in Figs. 1 to 8 inclusive, I provide an extensible shaft S supported in vertical position on a motor vehicle, and preferably in advance of the radiator of the vehicle, by means of brackets 15 and 16 secured, respectively, to a fender brace bar 17 and the front spring 19. On the upper end of the shaft is secured a spotlight L which is conventional in construction and which therefore forms no part of the present invention. The shaft S includes a rod 20 of tubular form constructed integral with a resilient arm 21 which is slotted, as best illustrated in Fig. 4, to receive a post 22 which rises vertically from an L-shaped arm 23. This arm 23 is adapted to be secured to the tie rod 24 of the steering mechanism of the automobile by means of a bracket 25, as best illustrated in Fig. 2. The vertical portion of the arm 23 is slotted to receive a link 26 carrying at its forward end a transverse pin 27, and secured at its rear end to a spring 28. The spring 28 in turn is connected to the rod 29 of an electric switch E, the rod being movable in a casing 30 and carrying the contact arm 31 which is adapted to engage stationary contacts 32 when the switch is in closed position.

Normally the switch E is open, a spring 33 being mounted on the rod to urge the latter to a position in which the arm 31 is out of engagement with the contacts 32.

The switch, just described, is mounted for swinging movement upon an arm 34 secured in horizontal position upon the front axle 35 of the motor vehicle by means of jaws 36 one of which is formed on the arm 34 and the other on a second arm 37 secured to the arm 34 by means of a bolt 38. A stud 39 extends through the rear end of the arm 34 and provides a pivot for an extension 40 of the switch casing 30. In this manner the switch as a whole is capable of swinging movement about the stud as a center in order to respond to certain movements of the mechanism by which the spotlight L is rendered dirigible.

The pin 27 secures the link 26 against withdrawal from the slot of the arm 23, and thus the pin provides an operative connection between the link and the arm so that under movement of the arm by reason of longitudinal movement of the tie bar 24, the link is actuated to cause closing of the switch through the intermediate spring 28. The spring provides an extensible connection between the switch rod 29 and the link 26 in order to compensate for variation in distance between the arm 23 and the switch, as will be understood.

By means of a pintle 41 a lever 42 is fulcrumed on the upper end of the arm 23, and the lower end of this lever is slotted to accommodate the link 26 and in such manner that the pin 27 is disposed at the forward side of the lever to be engaged by the latter when the lever is rocked to advance the link 26 a distance sufficient to close the switch. This lever 42 is adapted to be manually operated from a remote point and through any suitable mechanism. In the present instance this mechanism is shown as comprising a rod 43 movable in a sleeve 44 as secured within a suitable opening of the instrument board 45 of the motor vehicle. That end of the rod which projects to the operator's side of the instrument board has a handle 46 screw-threaded thereon, while the opposite end is operatively connected to a cable 47 trained over pulleys 48 and 49 mounted in any suitable manner beneath the engine hood. The cable 47 is extended forwardly from the pulley 49 or it is connected to the upper end of the lever 42. A spring 50 is mounted on the rod 43 to yieldably urge the rod forwardly, and in which position, the cable allows the lever 42 to assume the normal position illustrated in Fig. 2. By screwing the handle 46 forwardly on the rod, it abuts the instrument board and then pulls the rod rearward so that the cable 47 is actuated to move the lever 42 to such a position that the link 26 is advanced a distance sufficient to actuate the switch rod 29 and close the switch. Thus it will be seen that the mechanism provides a means by which manual closing of the switch can be effected independently of its operation by the mechanism which renders the spotlight L dirigible.

The operation of the mechanism just described, is as follows:—

With the front wheels of the vehicle positioned to steer the vehicle straightforward, the parts of the mechanism occupy the position shown in Figs. 1, 2, and 3, so that the spotlight is in such a position that when lighted, the beam emanating therefrom is projected straight ahead. However, in the normal position of the mechanism, the switch E is open so that the spotlight is extinguished. This switch is electrically connected to the spotlight and to a battery B as illustrated diagrammatically in Fig. 2, athough it will be understood that any conventional circuit can be employed so long as the switch controls the supply of current to the spotlight from the battery.

Thus, it will be apparent that as long as the vehicle is travelling straightforward, the spotlight remains extinguished, except, that it can be lighted through closure of the switch by manual actuation of the rod 43, as has been described. When the front wheels are moved to the right or left from this straight forward position in effecting turning movement of the vehicle to the right or left, (Fig. 6 illustrating the wheels as turned to the left) under the longitudinal shifting of the tie rod 24, the arm 23 is moved to rotate the shaft S through the post 22 and to thereby exert sufficient pull upon the link 26 to close the switch. Thus when the vehicle is turned either to the right or left from a straightforward position, the spotlight is automatically illuminated, and conversely, with return to the front wheels of the vehicle the switch is automatically opened under the action of the spring 33 to extinguish the spotlight.

Referring now to Figs. 9 and 10, I have here shown another form of mechanism for rendering a spotlight dirigible, and which mechanism is distinguished from the first form of my invention by the elimination of the manually operable mechanical means for closing the switch E, and the substitution therefor of a manually operable switch and the necessary circuits for controlling the supply of current to the spotlight independently of the switch E so as to effect illumination of the spotlight when and as desired.

As illustrated semi-diagrammatically in Fig. 10, the circuit for the spotlight L is associated with the usual lighting circuit of an automobile in such manner that the lighting circuit may be employed to supply current to the spotlight concurrently with the supply of current to the headlights and dependently or independently of the switch E. As here shown, the circuit for the headlights, indicated at H, includes a source of current such as a battery B, one side of which latter is grounded, while the other side is connected through a headlight switch E', and which switch when closed will supply current to the headlights. The spotlight L is provided with a main circuit which includes the switch E and the headlight switch E', this spotlight being connected in parallel with the headlights H. The spotlight is also provided with a branch circuit which omits the switch E but includes another switch E² as well as the battery B.

As will be clear from a consideration of Figs. 9 and 10, the mechanism for moving the spotlight L is the same as that employed in the first form of my invention, and it will therefore be understood that according as the front wheels of the automobile are turned in one direction or another from a straightforward position, the switch E will be closed. The two switches E and E' are adapted to be positioned on the instrument board of the automobile and within reach of the driver so that they may be opened and closed as required.

In the operation of the mechanism, the switch E' controls the supply of current from the battery B to the headlights H irrespective of the position of the front wheels of the automobile, and through the following circuit: from one side of battery B through wire 60 and 61, switch E', wire 62 and 63, to wire 64 which leads to both of the lamps H'. From the lamps the circuit is continued through wires 65 to ground, the opposite side of the battery being likewise grounded. When the switch E is closed through movement of the front wheels of the vehicle to effect a turning movement of the latter, current is supplied to the spotlight E through the following circuit: from wire 62 through one contact of the switch E to the other contact through the bridging contact 33, then to wire 66 to the spotlight L. The other side of the spotlight is grounded as shown thus completing the circuit to the grounded side of the battery B. It will thus be seen that although the headlights are continuously illuminated when the switch E' is closed, the spotlight L is illuminated only when the switch E is closed under steering movements of the front wheels of the vehicle.

The branch circuit for the spotlight L permits illumination of the spotlight independently of the switch E, and this circuit may be traced as follows: from wire 60 through switch E², wire 67 to wire 66 and from the latter to the spot light L. Thus the switch E is excluded from the branch circuit and hence the spotlight L will be illuminated with closure of the switch E².

Although I have herein shown and described only two forms of mechanism for rendering spotlights dirigible embodying my invention, it is to be understood that various changes and modifications may be made therein without departing from the spirit of the invention and the spirit and scope of the appended claims.

I claim as my invention:

1. In combination, means for supporting a spotlight on a vehicle for rotating movements about a fixed axis, means for operatively connecting the first means to the steering mechanism of the vehicle so that the spotlight is rotated in one direction or the other according as the front wheels of the vehicle are turned in one direction or the other, a switch for controlling the supply of current to the spotlight, means for biasing the switch to open position, and means correlated to the second mentioned means for moving the switch to closed position against the action of the biasing means when the spotlight is moved in either direction from a medial position.

2. In combination, means for supporting a spotlight on a vehicle for movements about a vertical axis from a medial position to either of two extreme positions, means for operatvely connecting the first means to the steering mechanism of the vehicle so that the spotlight is moved in one direction or the other from the medial position according as the front wheels of the vehicle are turned in one direction or the other, a switch for controlling the supply of current to the spotlight, means for biasing the switch to an open position, and means correlated to the second mentioned means for closing the switch when the spot-light is moved in either direction from the medial position.

3. A combination as embodied in claim 2 wherein means is operatively connected to the last mentioned means for closing the switch independenetly of the first mentioned means.

4. A combination as embodied in claim 2 wherein a lever is operatively connected to the last mentioned means which is operable to close the switch independently of the first mentioned means, and means remotely disposed with respect to the lever but operatively connected thereto by which the lever may be manually actuated to close the switch.

5. In combination, a mechanism for rendering a spotlight on a vehicle dirigible, said mechanism including an arm adapted to be secured to the rod of the vehicle, a member having means for fixing it to the front axle of the vehicle, a switch mounted on the member for swinging movements, means for biasing the switch to closed position, an operative connection between the arm and switch for closing the switch against the action of said biasing means when the tie rod is moved in either direction from its normal position or that position in which the vehicle is steered in a straightforward direction, and a circuit for the spotlight including a source of current and the switch.

6. A combination as embodied in claim 5 wherein means is correlated to said operative connection by which the switch can be manually closed.

7. A combination as embodied in claim 5, wherein a lever is associated with said operative connection for operating the latter to close the switch, and means is connected to the lever for operating the latter from a remote point.

8. In combination, a mechanism for rendering a spotlight on a vehicle dirigible, said mechanism including an arm adapted to be secured to the tie rod of the vehicle, said arm having a slotted portion, a member having means for fixing it to the front axle of the vehicle, a switch mounted on the member for swinging movements, means for biasing the switch to closed position, a spring connected to the switch, a link connected to the spring and extending through the slotted portion of said arm, a pin extending through the link for securing the latter against withdrawal from the slotted portion of said arm, and a circuit for the spotlight including a source of current and a switch.

9. A combination as embodied in claim 8 wherein a lever is fulcrumed on the slotted portion of said arm and provided with a slot through which said link extends so that said pin abuts the lever to prevent withdrawal of the link from the slot, and flexible means operatively connected to the lever for actuating the latter to move said link through the medium of said pin for closing said switch.

10. In combination a spotlight, mechanism for rendering the spotlight dirigible to move it in accordance with the steering movements of the front wheels of a vehicle, a switch for controlling the supply of current from a suitable source to the spotlight, means operatively connecting the switch to the mechanism so that the switch is closed only when the mechanism is moved by steering movements of the vehicle wheels, and a second switch manually operable to control the supply of current from said source to the spotlight independently of the first switch.

11. In combination, a lighting system for motor vehicles including headlights, a source of current, a circuit and a switch manually operable to control the supply of current to the headlights from said source, a spotlight, mechanism for rendering the spotlight dirigible in accordance with steering movements of the front wheels of a motor vehicle, a second switch for controlling the supply of current to the spotlight from said source, means operatively connecting the second switch to the mechanism so that said switch is closed only when the mechanism is moved by steering movements of the front motor vehicle wheels, a third switch manually operable to control the supply of current from said source to the spotlight independently of the second switch, a main circuit connected to the headlight circuit and including the spotlight and the second switch, and a branch circuit connected to the main circuit and including the spotlight and the third switch.

ANDREW R. WAMMACK.